US005429698A

United States Patent [19]

Hartman et al.

[11] Patent Number: 5,429,698

[45] Date of Patent: Jul. 4, 1995

[54] METHODS AND APPARATUS FOR PRINTING AND COLLATING MATERIALS FROM MULTIPLE WEBS

[75] Inventors: Robert M. Hartman, Alpharetta; Scott C. Abrahamson, Duluth; John S. Bennett, Fayetteville; Benny R. Rich, Oakwood, all of Ga.

[73] Assignee: Dittler Brothers Incorporated, Atlanta, Ga.

[21] Appl. No.: 167,452

[22] Filed: Dec. 15, 1993

Related U.S. Application Data

[60] Continuation of Ser. No. 856,987, Mar. 24, 1992, abandoned, which is a division of Ser. No. 856,422, Sep. 21, 1990, Pat. No. 5,117,610.

[51] Int. Cl.[6] ............ B32B 31/00

[52] U.S. Cl. ............ 156/250; 156/259; 156/264; 156/277; 156/512; 101/93.11; 53/131.5; 270/1.1; 493/325

[58] Field of Search ............ 156/250, 259, 260, 264, 156/441.5, 494, 512, 277; 53/131.5, 206, 209, 411, 435, 450, 460, 520, 553; 493/187, 188, 320–325; 101/DIG. 42, 93.11, 93.08; 270/1.1

[56] References Cited

U.S. PATENT DOCUMENTS

| | | | |
|---|---|---|---|
| 3,808,768 | 5/1974 | Dobbs | 53/31 |
| 4,205,504 | 6/1980 | Gregoire et al. | 43/4 |
| 4,220,081 | 9/1980 | Hawkinson | 101/93.11 |
| 4,312,169 | 1/1982 | Golicz et al. | 53/206 |
| 4,328,064 | 5/1982 | Miller, Jr. et al. | 156/558 |
| 4,337,589 | 7/1982 | Volkert et al. | 40/124.1 |
| 4,455,809 | 6/1984 | Dallaserra | 53/435 |
| 4,769,969 | 9/1988 | Minami | 53/117 |
| 4,900,001 | 2/1990 | Lapeyre | 270/1.1 |
| 4,939,888 | 7/1990 | Katz et al. | 53/411 |
| 4,963,125 | 10/1990 | Volkert | 493/334 |
| 5,038,155 | 8/1991 | Yamagishi et al. | 34.6/76 PH |
| 5,197,262 | 3/1993 | Katz et al. | 53/553 X |

*Primary Examiner*—James J. Engel

*Attorney, Agent, or Firm*—Kilpatrick & Cody

[57] ABSTRACT

Methods and apparatus for printing and collating multiple webs of materials, particularly for use in creating personalized direct mail materials, are disclosed. The invention includes a single, highly flexible press having components capable of being driven at unequal speeds to account for different sizes of insert materials and their associated envelopes. Operating a single press in this manner reduces the amount of waste web material which otherwise would be present. The press similarly includes novel collating and inserting apparatus whereby each outgoing envelope is effectively formed around the "insertable" materials. Control mechanisms and verification systems associated with the press additionally maintain any personalized materials in registration, permitting a single press to produce the entire direct mail piece from multiple webs with minimal waste.

2 Claims, 16 Drawing Sheets

METHODS AND APPARATUS FOR PRINTING AND COLLATING MATERIALS FROM MULTIPLE WEBS

This application is a continuation of application Ser. No. 07/856,987 now abandoned, filed Mar. 24, 1992, which is a divisional of application Ser. No. 07/586,422 (now U.S. Pat. No. 5,117,610), filed Sep. 21, 1990.

This invention relates to the printing and collating of materials, typically paper, from multiple webs. The invention relates more particularly both to printing onto multiple webs using a single press having components capable of operating at unequal speeds and to collating the printed materials to form envelopes with inserts or other analogous products.

BACKGROUND OF THE INVENTION

Advertisers increasingly are utilizing the postal service and other delivery carriers to promote their products to consumers. Called "direct" mailings, the promotional materials transmitted by advertisers via the mail possess distinct advantages over those placed in other media presently available. Unlike standard television and radio ads, for example, direct mailings may be "personalized" to each recipient by including unique identifying information such as names and addresses in the bodies of the materials transmitted. Direct mailings also provide tangible means of expressing the advertiser's message which, unlike untaped television and radio ads, remain available for further review. Including "involvement devices" such as scrambled messages, scratch-off compositions, or unfoldable three-dimensional "pop-ups" in the direct mail materials additionally may increase the recipient response rate over other types of advertisements, making direct mailings an important method for promoting products and services.

Printing and collating personalized direct mail materials, however, is a difficult and burdensome task. Because the unique identifying information used to personalize the mailings may appear in multiple locations and on numerous differing inserts, failure to register the various materials may cause a particular individual to receive materials personalized for another. The differing sizes of and paper types used for the envelopes and insertable materials similarly all but preclude use of a single traditional press or multiple web, constant speed press run, as maintaining the materials in registration results in, at minimum, waste equal to the difference between the largest and smallest images multiplied by the number of images on the webs.

Moreover, in many cases direct mail materials are printed separately from any collating and inserting operations and subsequently are collated and inserted into envelopes. These multiple run processes introduce new difficulties into the overall operations-particularly if the materials are personalized-as registration of the materials must be maintained through the multiple runs. Inefficiencies frequently result as well, since the equipment may need to be reconfigured between runs to perform the necessary operations sequentially.

SUMMARY OF THE INVENTION

The present invention avoids many of the problems traditionally associated with producing direct mail and analogous materials, including "pop-ups" (whether or not used as direct mail materials), by providing a single, highly flexible press having components capable of operating at different speeds. The press similarly includes novel collating and inserting apparatus, whereby each outgoing envelope is in effect formed around the "insertable" materials. Control mechanisms associated with the press additionally maintain any personalized materials in registration, permitting a single press to produce the entire direct mail piece from multiple webs with minimal waste.

Included as part of the press mechanism are interchangeable sets of pulleys used to couple various components to a drive line. These pulley sets permit selected equipment to operate at speeds different from the remainder of the press components, allowing the number of printed impressions per revolution of the printing cylinder for one or more webs to differ from the number of impressions on the other webs printed concurrently on the same press. In other words, operating selected equipment at different speeds permits "x" impressions to be printed per a given length of the first web and "y" impressions to be printed for the same length of the second web, where "x" and "y" may, but need not, be equal. If each impression on the first web is, for example, larger than its corresponding impression on the second web (as could occur if the second web ultimately was used to form envelopes into which portions of the first web were folded one or more times and inserted), fewer impressions per given length of the first web would be required. Absent variable control of the operating equipment, the "x" and "y" values would be equal, resulting in a substantial portion of the second web not containing printed matter and therefore being wasted. Because the invention is not limited to use in connection with two webs, varying the equipment speed ratios permits concurrent creation of almost an infinite variety of insert material sizes with minimum wasted paper.

During the overall process each web is divided into appropriately sized "ribbons" containing continuous streams of printed or to-be-printed materials. After each ribbon is printed and otherwise processed, additional equipment combines, or "gathers," selected ribbons into a single uniform stream. This gathering equipment also provides independent tension control for each ribbon forming part of the combined stream, enabling individual ribbons having differing coefficients of friction to be melded. Ribbon streams destined to form the fronts and backs of envelopes remain divided, with one stream travelling through a gluer, and are conveyed to a common location. The gathered ribbon stream containing insert materials simultaneously is cut into individual pieces, with the pieces being conveyed to the common location and merged, or "inserted," between the two envelope portion streams. This process captures the inserts between the envelope front and back streams, which subsequently are finally glued and otherwise processed and cut into individual envelopes.

The devices (and associated techniques) discussed as part of the present invention have been designed to function (and be practiced) integrally in order to produce direct mail and analogous materials in-line with minimal paper waste while using a single press. They need not be used in this manner, however, as each of the novel concepts described herein may be employed in other contexts. Similarly, the printed materials created by the press may be diverted at any point for processing different from that explicitly described herein. As a result, utilizing the devices and techniques of the present invention allows those having ordinary skill in the art to create printing lines and other sets of equipment capable of performing a wide variety of functions.

It is therefore an object of the present invention to provide a highly flexible press capable of printing and collating materials from multiple webs.

It is another object of the present invention to provide a press having integrated components capable of operating at differing speeds.

It is yet another object of the present invention to provide a press capable of printing direct mail materials containing multiple personalized inserts registered one with the other.

It is also an object of the present invention to provide equipment capable of and techniques for collating materials having differing coefficients of friction.

It is another object of the present invention to provide equipment capable of and techniques for "inserting" materials by forming the housing (e.g. an envelope) around the materials.

It is an object of the present invention to provide equipment capable of and techniques for printing multiple image sets, each set having a different size, on different webs with minimal paper waste.

Other objects, features, and advantages of the present invention will become apparent with reference to the remainder of the written portion and the drawings of this application.

DETAILED DESCRIPTION

A. Printing Line Overview

Figure 1:
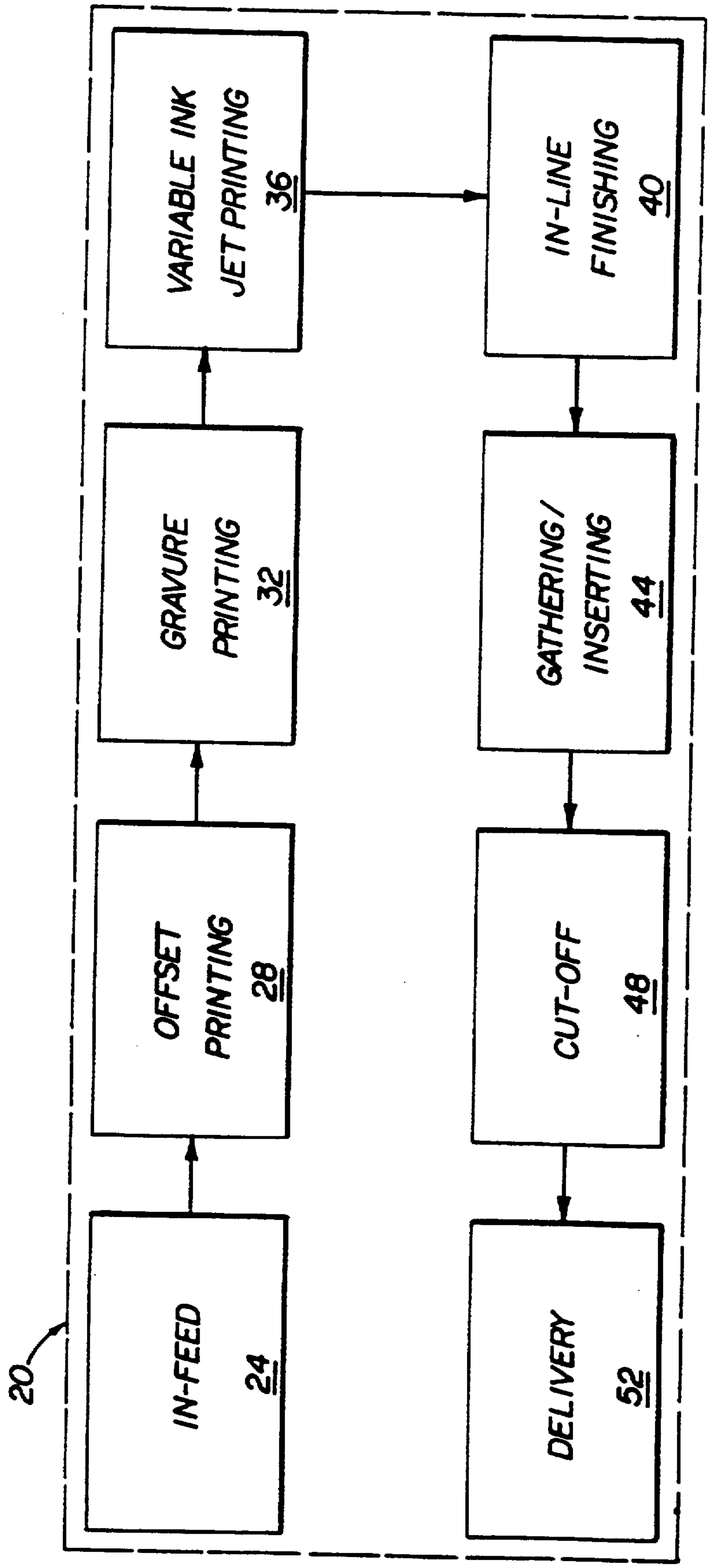
FIG. 1 is a block diagram of some of the functions which may be performed by equipment forming part of the present invention.

FIG. 1 is a block diagram illustrating some of the functions which may be performed by equipment constituting printing line 20 of the present invention. As shown in FIG. 1, the functions performed by printing line 20 on one or more webs include in-line feeding (block 24), offset printing (block 28), gravure printing (block 32), variable ink jet printing (block 36), and in-line finishing (block 40), followed by gathering and inserting (block 44), cutting (block 48), and delivering (block 52) finished materials created from the webs. Equipment included in printing line 20 additionally may control the registration, tension, and other parameters associated with the webs and verify that the parameters are within acceptable limits. As a result, printing line 20 is capable of converting multiple webs of raw materials such as various forms and sizes of paper into a wide variety of multiply-personalized, finished direct mail and similar materials using a single sequential line of equipment.

FIGS. 2A–C and 3A–B outline equipment which may form part of printing line 20. Referring to FIGS. 2-3, webs $W_1$, $W_2$, and $W_3$, which typically may be rolls of paper of varying styles, are shown positioned respectively on roll stands 56, 60, and 64. Each of roll stands 56, 60, and 64 may be a Butler Splicer Model 4042-8 capable of storing its associated web roll and providing a length of the roll on demand. Roll stands 56, 60, and 64 additionally may include automatic splicing equipment to permit splicing rolls to their replacements ($W_2'$ and $W_3'$ of FIG. 3A) without stopping printing line 20. FIG. 2 illustrates roll stand 56 positioned at a 90° angle to stands 60 and 64, with paper from web $W_1$ travelling over angle bar 68 to place it parallel to webs $W_2$ and $W_3$. Roll stands 56, 60, and 64 may be positioned in any of a variety of manners, however. Similarly, although one embodiment of printing line 20 contemplates use of three webs, the invention is not so limited, and fewer or more webs may be used simultaneously.

Figure 2A:
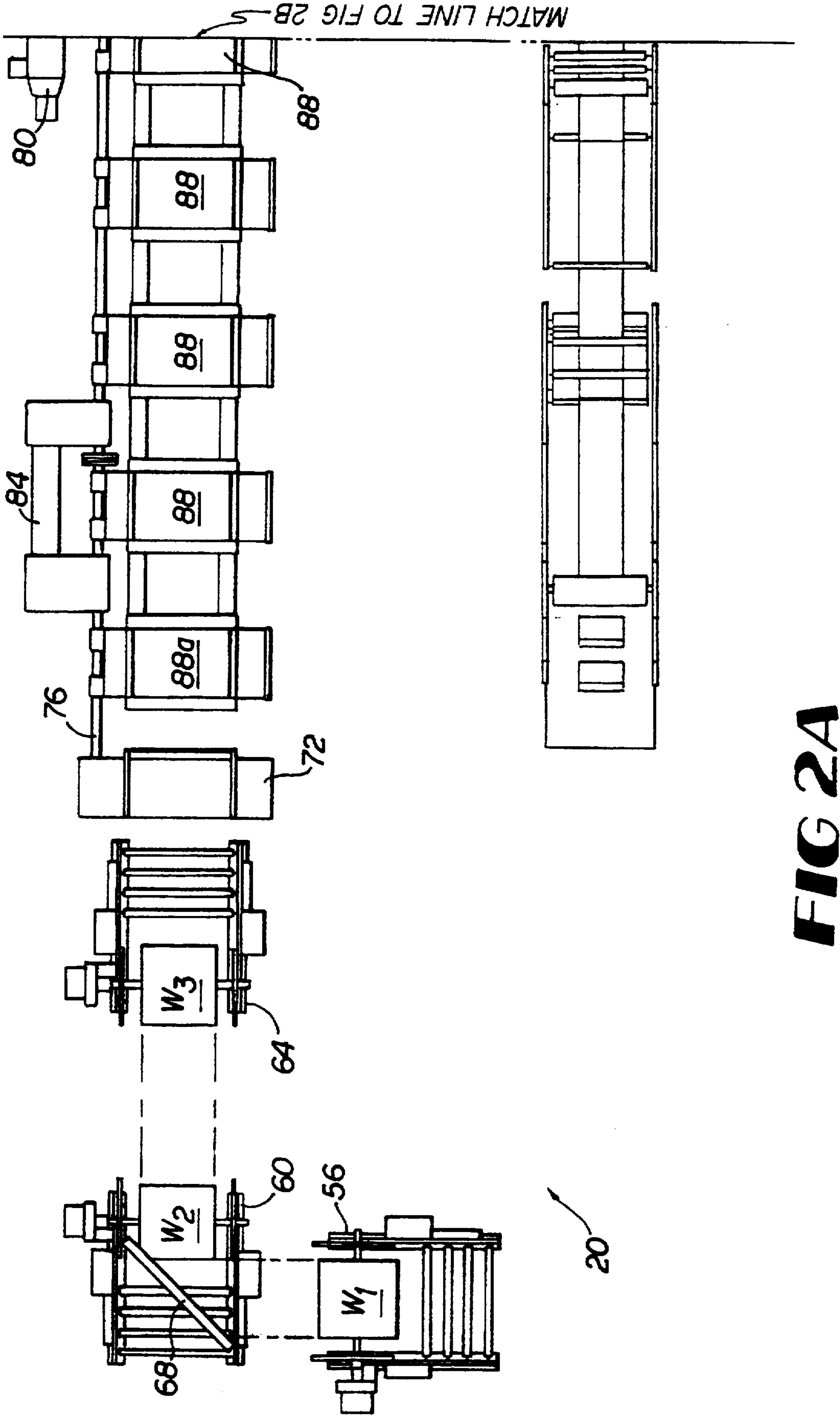
FIG. 2A–C is a partially schematicized top plan view of the equipment forming part of the present invention as referenced in FIG. 1.

In-line feeding (block 24) of material from webs $W_1$, $W_2$, and $W_3$ may be accomplished using driven equipment, or in-feed units 72, capable of tensioning the web rolls sufficiently to induce movement. In-feed units 72 may be Butler Models 412D-40B, with one unit associated with each of webs $W_1$, $W_2$, and $W_3$. Drive line 76 couples in-feed units 72 to drive motor 80, which in one embodiment of the present invention may be a 150 hp/1750 rpm DC motor with an Allen Bradley DC Drive Control. FIG. 2A also illustrates speed change drive mechanism 84, discussed in greater detail in connection with FIGS. 9-12. Speed change drive 84 is, however, used to permit the multiple in-feed units 72 to operate at different speeds.

Also shown in FIGS. 2A–B and 3A–B are printing units 88. Printing units 88, eight of which are illustrated in serial form, may be standard offset printers such as the Hantcho Mark VI Serial No. W-646 or W-567 having a 22.776" cylinder circumference. As with the number of webs, however, the present invention is not limited to eight printing units 88, and either more or fewer of such units may be utilized as appropriate. Units 88 perform the offset printing function listed in block 20 of FIG. 1 and may be coupled to drive line 76 and driven at different speeds by speed change drive 84. In one embodiment of printing line 20 consistent with FIG.

2A, unit 88a is coupled to speed change drive 84, permitting the operational speed of this unit to differ from that of the remainder of units 88. Additionally, each of webs $W_1$, $W_2$, and $W_3$ need travel through only the printing units 88 containing colors appropriate for the image ultimately to be presented on the web, so that fewer than eight units 88 may be used in connection with the printing of any given web. Ink printed on webs $W_1$, $W_2$, and $W_3$ using printing units 88 may be dried using dryers 92 and crystallized using chill units 96, which also function to cool webs $W_1$, $W_2$, and $W_3$. Three TEC Dryer Model 1000 driers may be used for dryers 92, while a similar number of TEC Chill Units may be used for units 96.

Figure 2B:
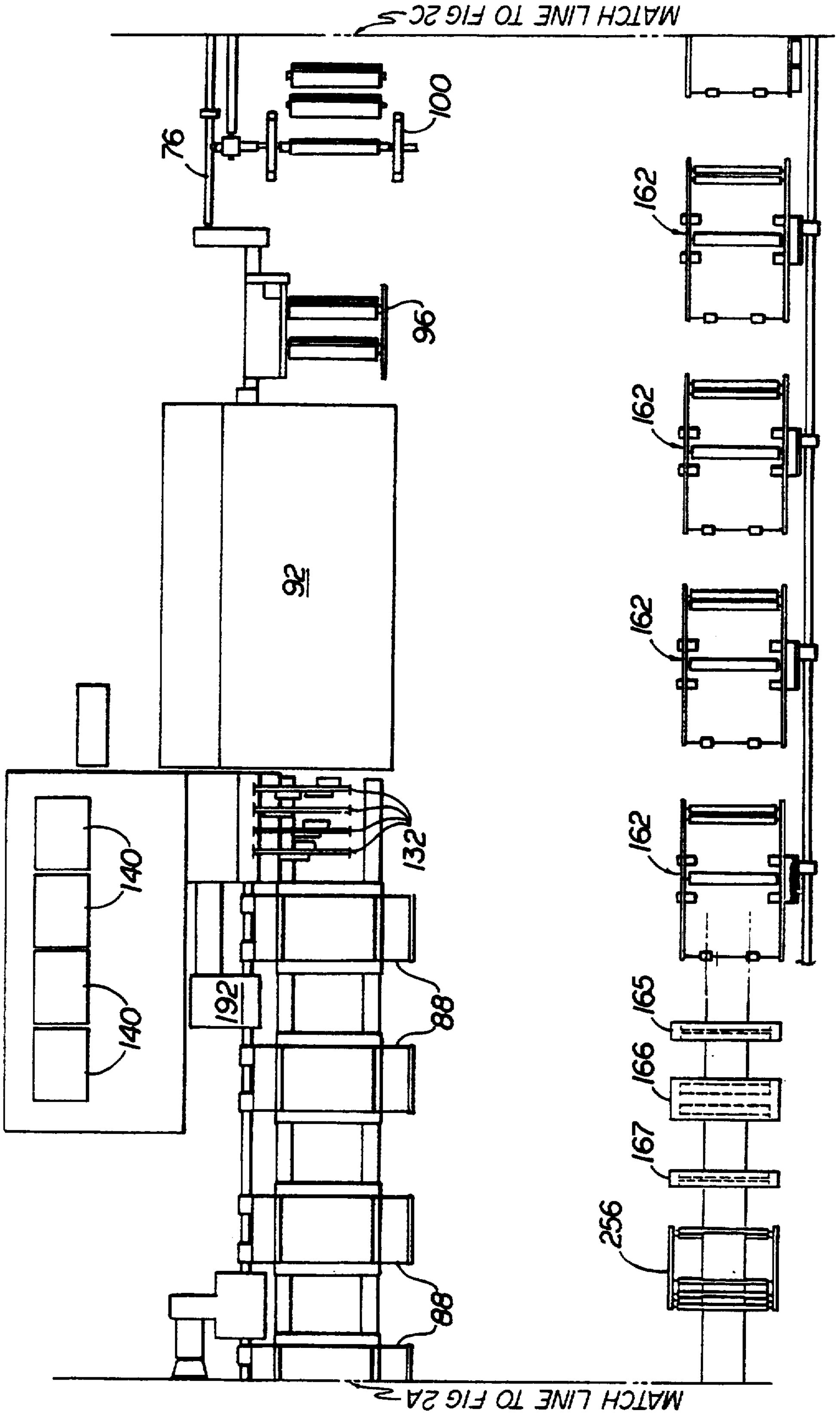
Figure 2C:
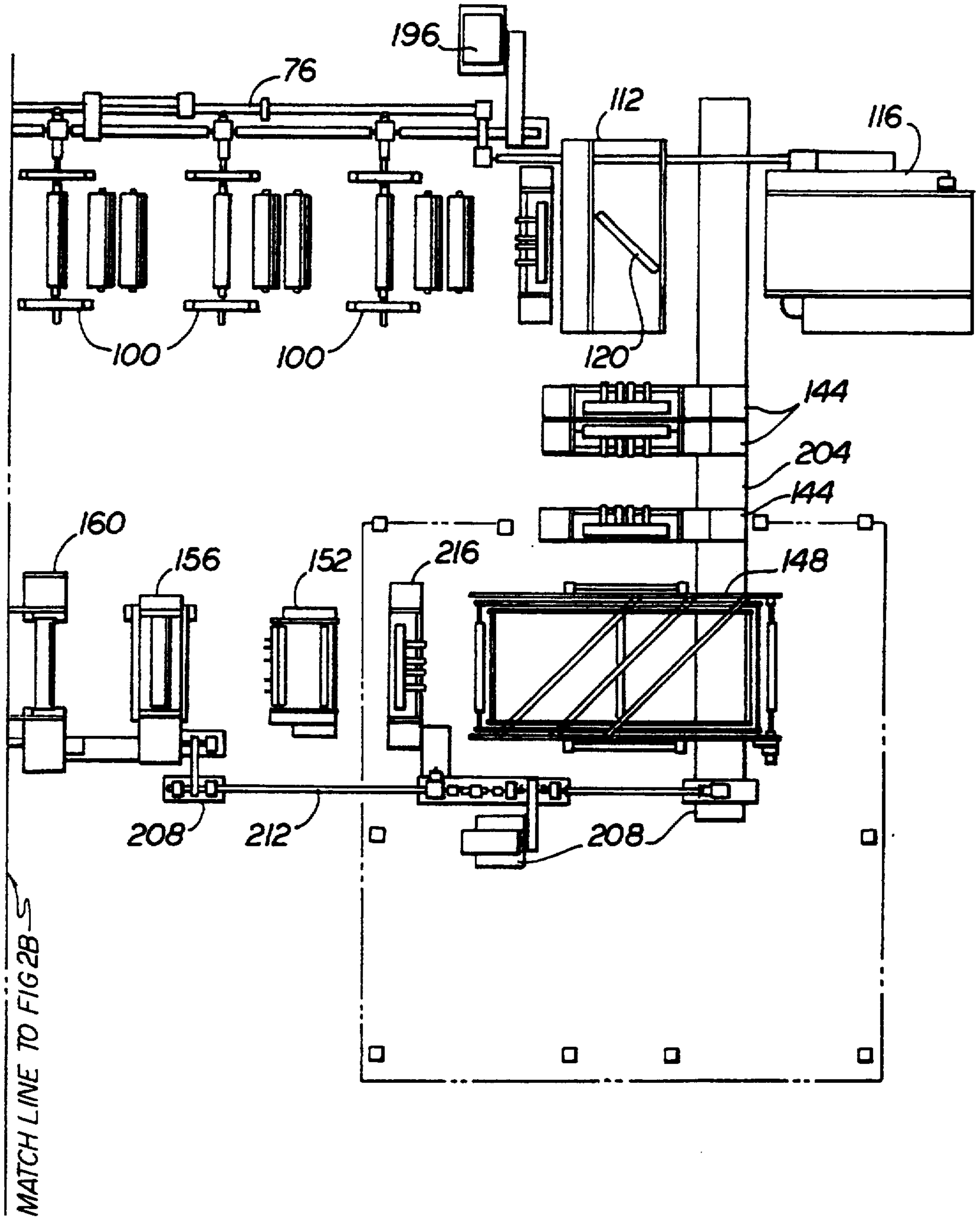
Figure 3A:
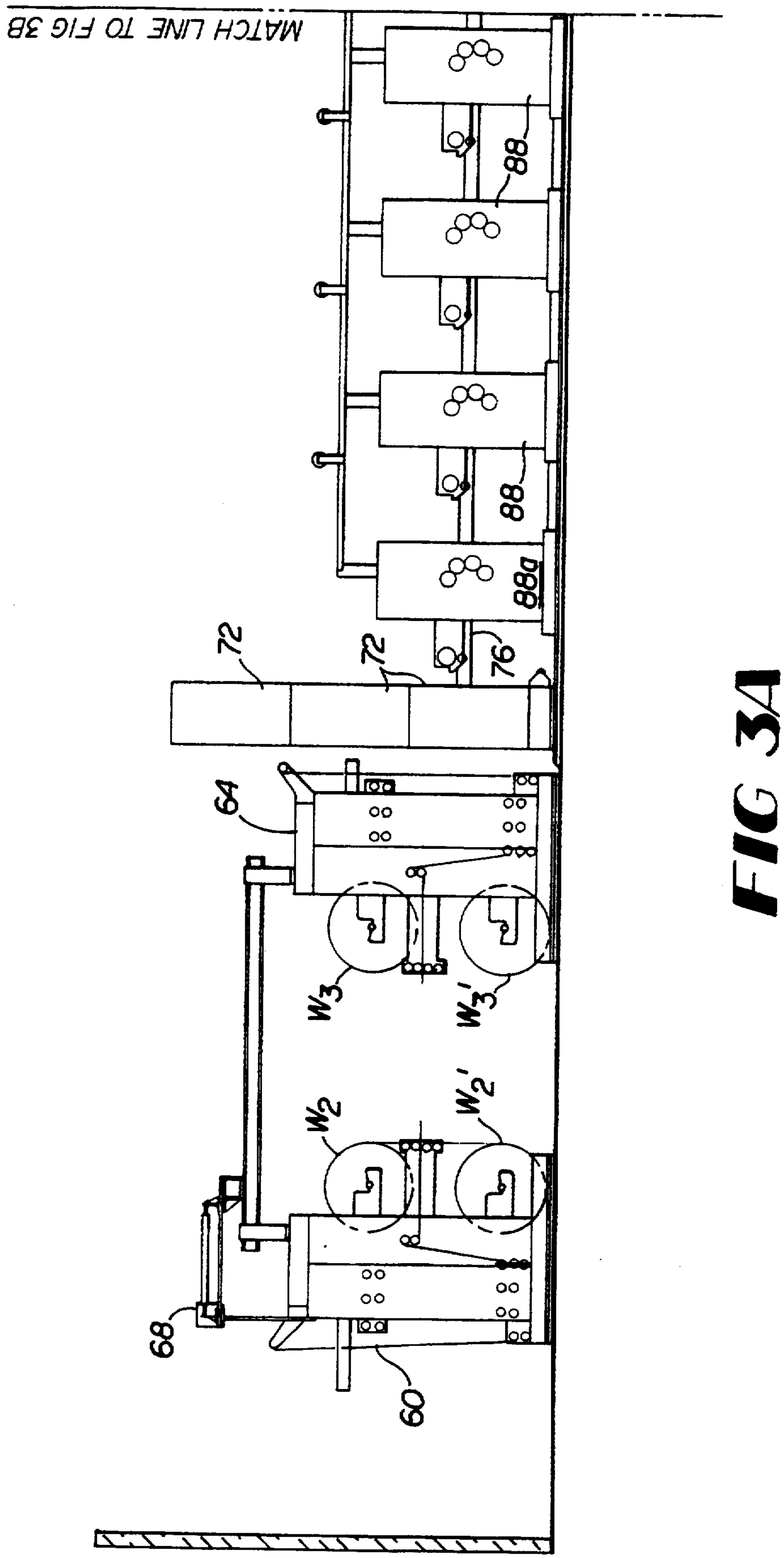
FIG. 3A–B is a partially schematicized side elevational view of a first portion of the equipment of FIG. 2 detailing, among other things, offset and variable ink jet printing units and dryers forming part of the present invention.
Figure 3B:
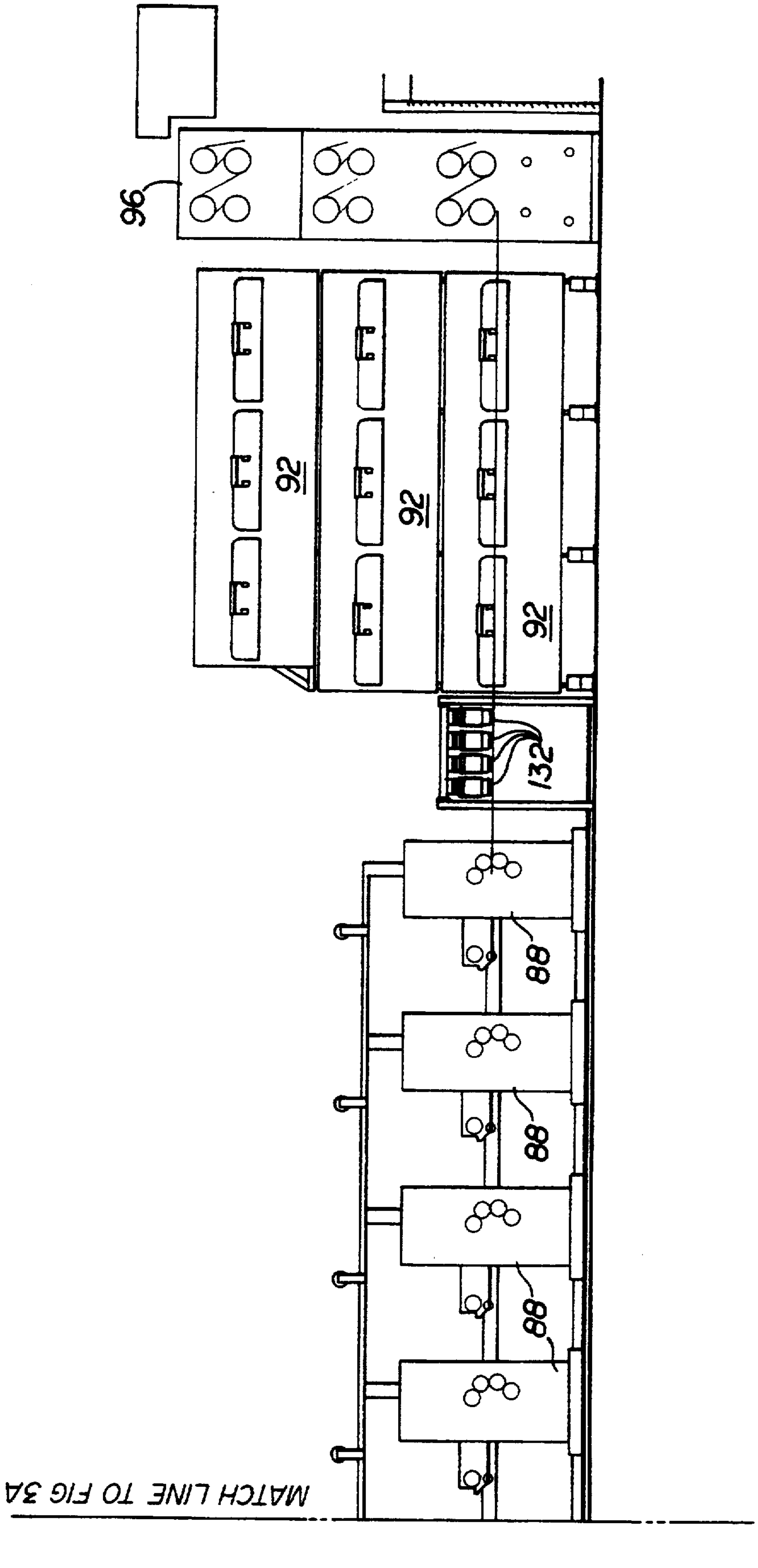
Figure 4:
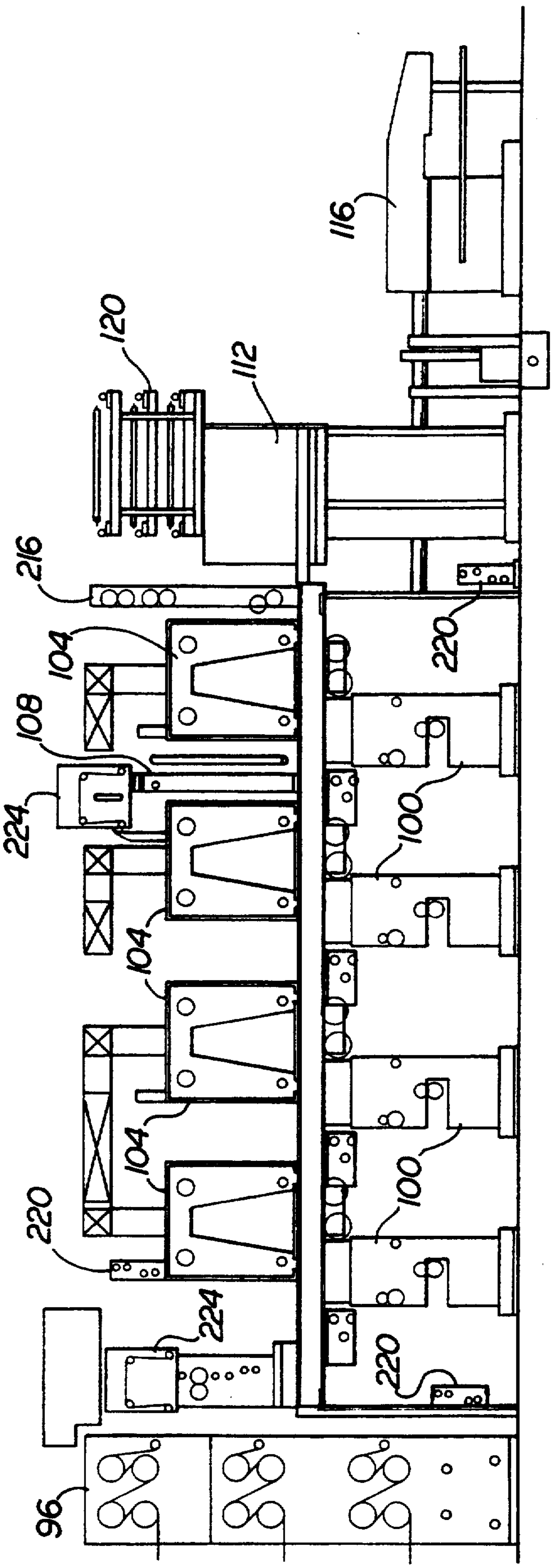
FIG. 4 is a partially schematicized side elevational view of a second portion of the equipment of FIG. 2 detailing, among other things, gravure printing units forming part of the present invention.

The gravure printing shown in block 32 subsequently may be accomplished using printing units 100 of FIGS. 2B–C and 4. Illustrated in FIGS. 2B–C and 4 are four standard in-line rotogravure printing units 100 capable of accepting cylinders with circumferences of 22.776". Equipment 104 such as driers and chill stands also may be used in connection with units 100, and web shifter 108 may be included in line 20 to permit printing on the reverse of the webs, particularly if printing units 100 are not constructed for two-sided printing. As shown in FIG. 4, web shifter 108 is positioned to permit the final unit 100 in sequence to print on the reverse of the webs.

Additionally illustrated in FIGS. 2C and 4 are a folder 112, sheeter 116, and angle bar 120. If further printing and in-line processing of webs $W_1$, $W_2$, and $W_3$ is not desired, the webs alternatively may be routed to folder 112 and sheeter 116 as necessary to cut and fold the webs into final products (or for other processing). In one embodiment of the present invention folder 112 is a standard folder manufactured by Hantcho and sheeter 116 a standard sheeter manufactured by Clarke-Aiken. Routing webs $W_1$, $W_2$, and $W_3$ through angle bar 120 reorients the webs 90°, permitting additional in-line processing in the normal plant environment without utilizing excessive floor space. Reorienting the webs using angle bar 120 is not required as part of printing line 20, however.

Figure 5:
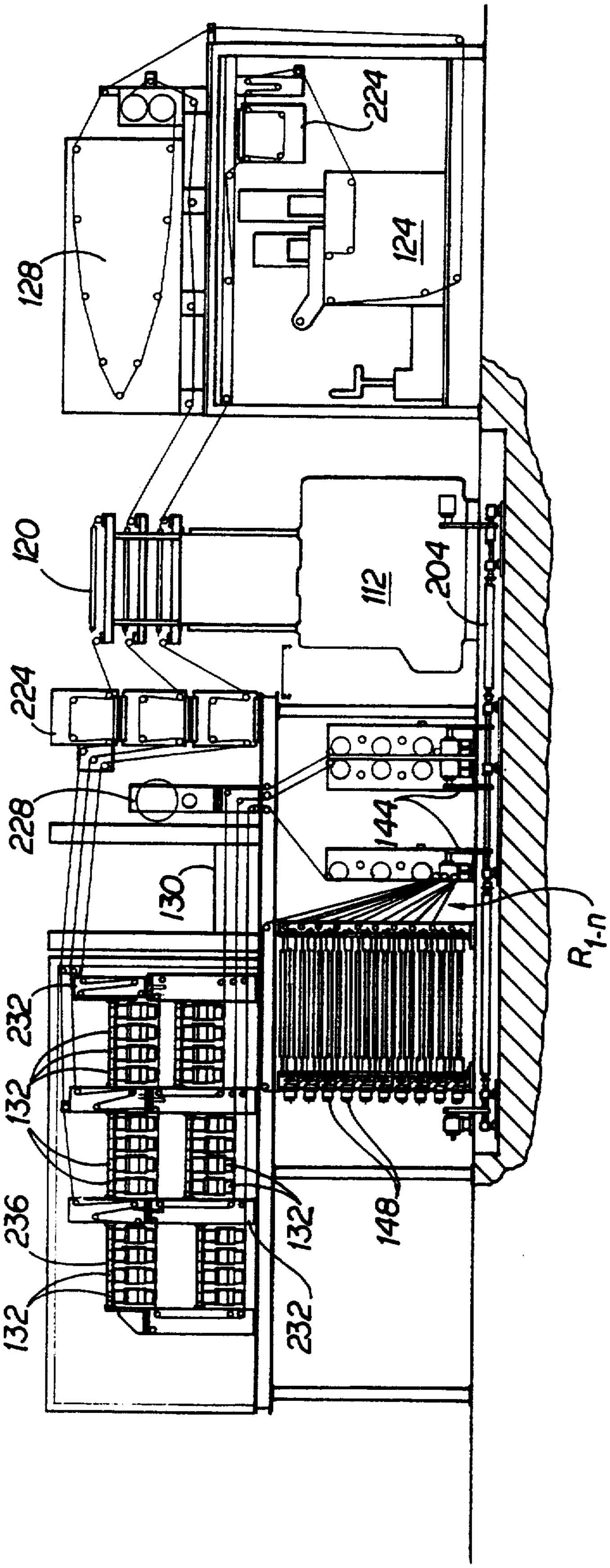
FIG. 5 is a partially schematicized side elevational view of a third portion of the equipment of FIG. 2 detailing, among other things, additional variable ink jet printing units and dryers forming part of the present invention.
Figure 6:
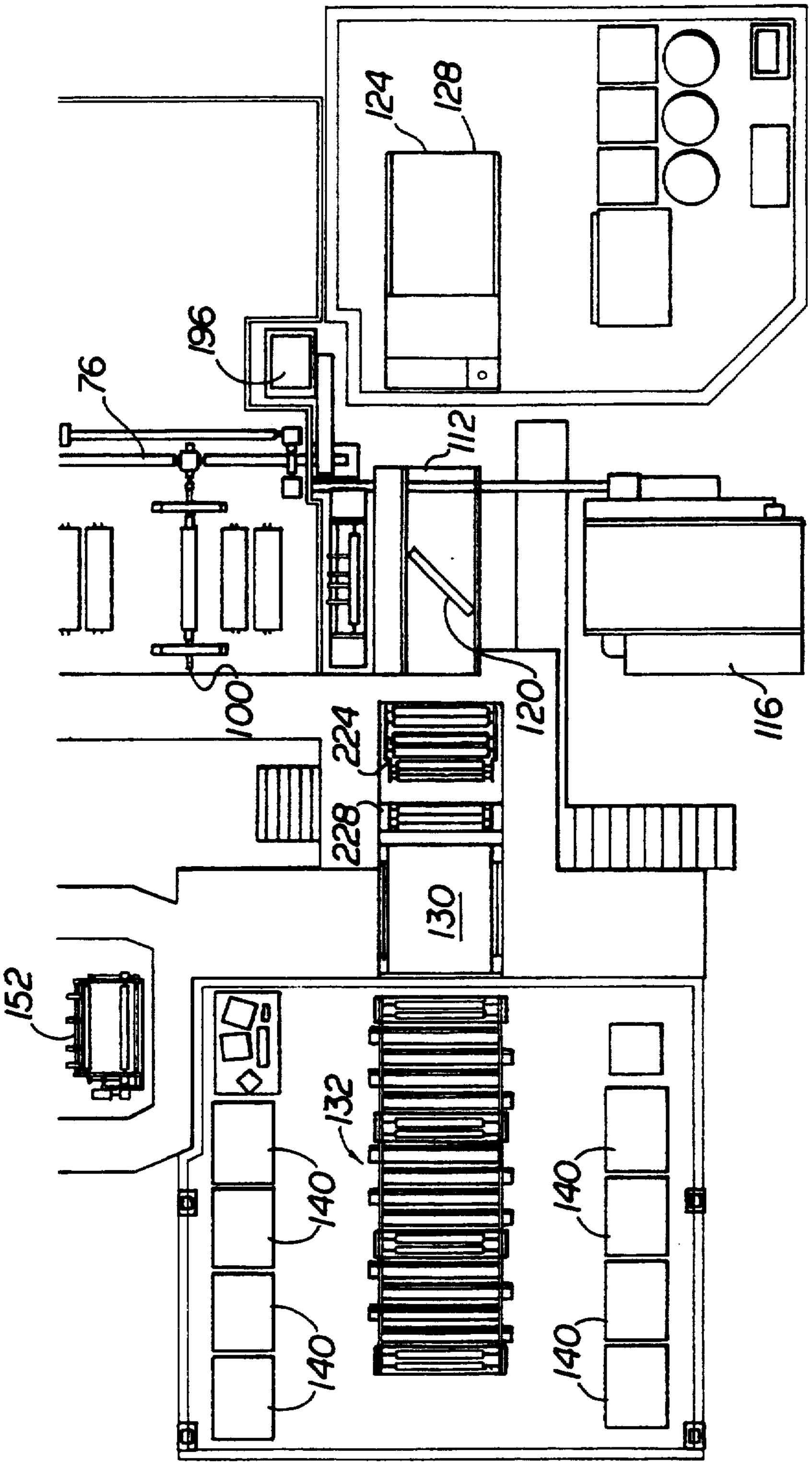
FIG. 6 is a partially schematicized top plan view of the equipment of FIG. 5.

FIGS. 5–6 detail yet another alternative route for webs $W_1$, $W_2$, and $W_3$ following their travel through printing units 100, leading to and returning from ink jet imager 124 and its associated drying equipment 128. Ink jet imager 124 typically is a Diconix 2900 or 2800 imager available from the Eastman-Kodak Company, although any appropriate imager or other processing apparatus may be used. Printing line 20 continues by routing webs $W_1$, $W_2$, and $W_3$ through web guides 224 to position the webs appropriately for ink jet printing using printers 132. In the embodiment of the invention illustrated in FIG. 5, twenty-four ink jet printers 132 are shown in printing line 20, although substantially fewer than twenty-four frequently are necessary. Printers 132 may be Admark III ink jet printers, also available from Eastman-Kodak, and may be synchronized by high speed data control systems 140 such as the PAC-10000 and PAC-12000 available from Prism, Inc. of Atlanta, Ga., each of which is capable of controlling and synchronizing multiple Admark III systems. Ink jet printers 132 are multi-orifice, continuous flow devices using a laminar stream of ink separated into droplets and dispersed to their appropriate locations using electrical charge. Charged droplets are attracted to a basin for recirculation while uncharged drops are deposited onto webs $W_1$, $W_2$, and $W_3$ or any other appropriately positioned substrate. Utilizing Admark III systems for printing units 132 also provides access to a wide variety of fonts and inks and a non-stationary imaging head capable of printing an imaging width of up to 1.067" at various locations on webs $W_1$, $W_2$, and $W_3$. Ink jet printers 132 and associated control equipment 140 also may-be positioned at other appropriate locations in printing line 20 (see e.g. FIG. 2B) as desired.

Figure 7A:
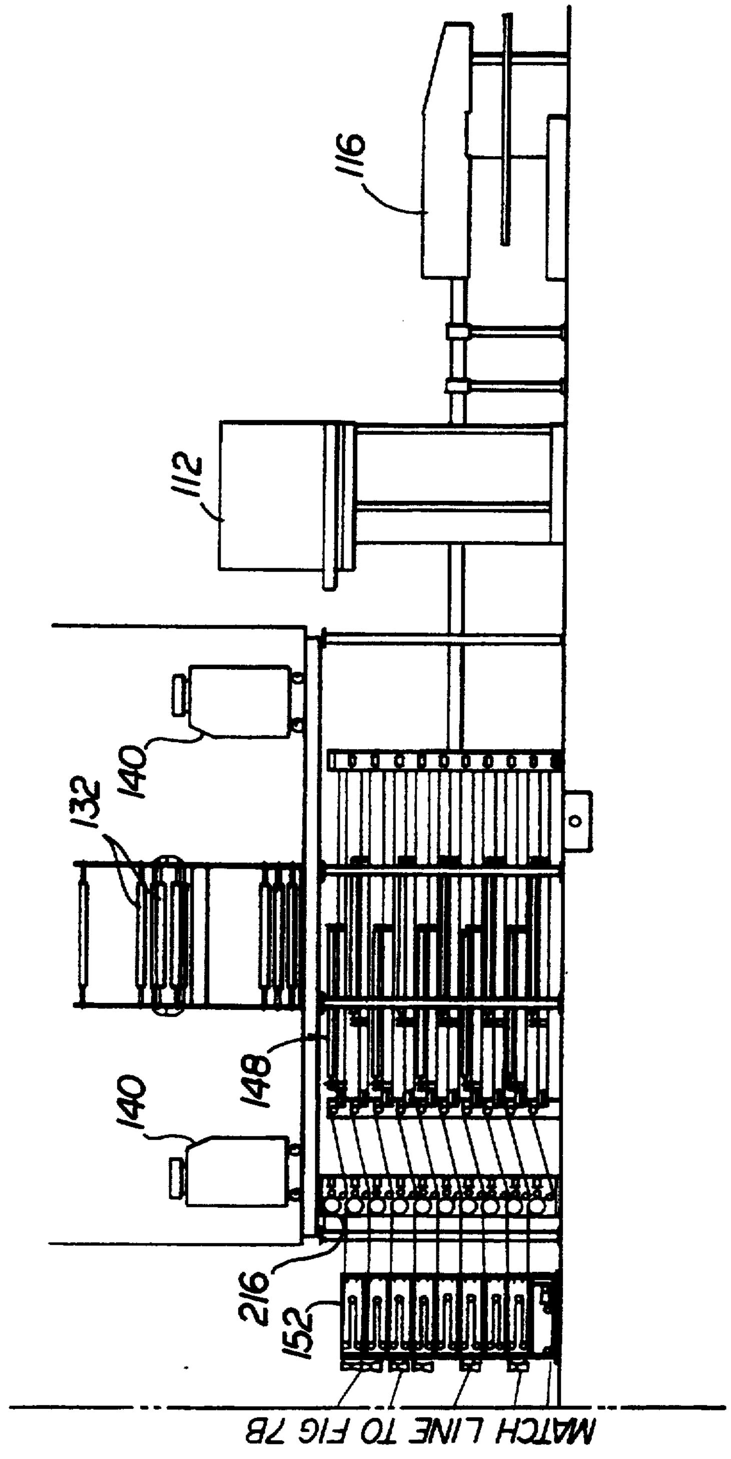
FIG. 7A–C is a partially schematicized side elevational view of a fourth portion of the equipment of FIG. 2 detailing, among other things, gathering and inserting equipment forming part of the present invention.
Figure 7B:
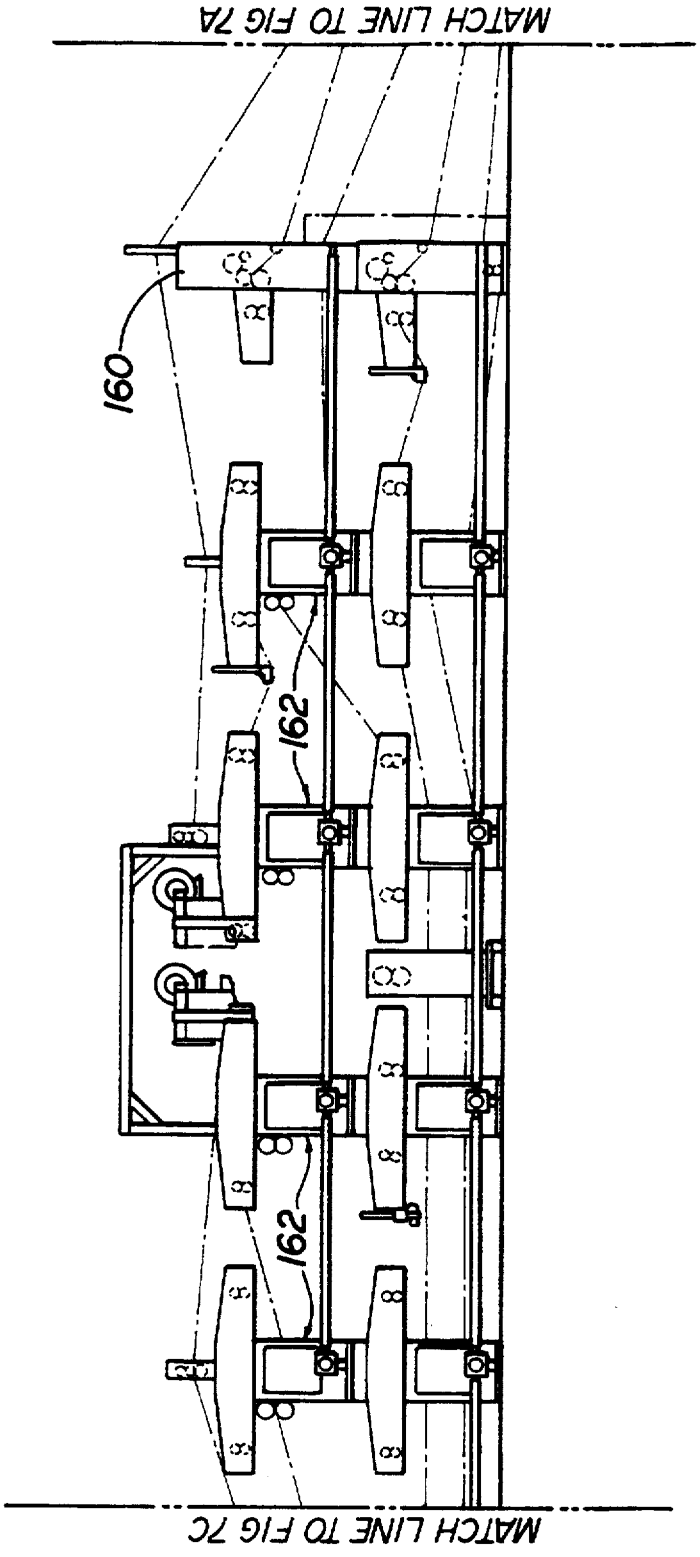
Figure 7C:
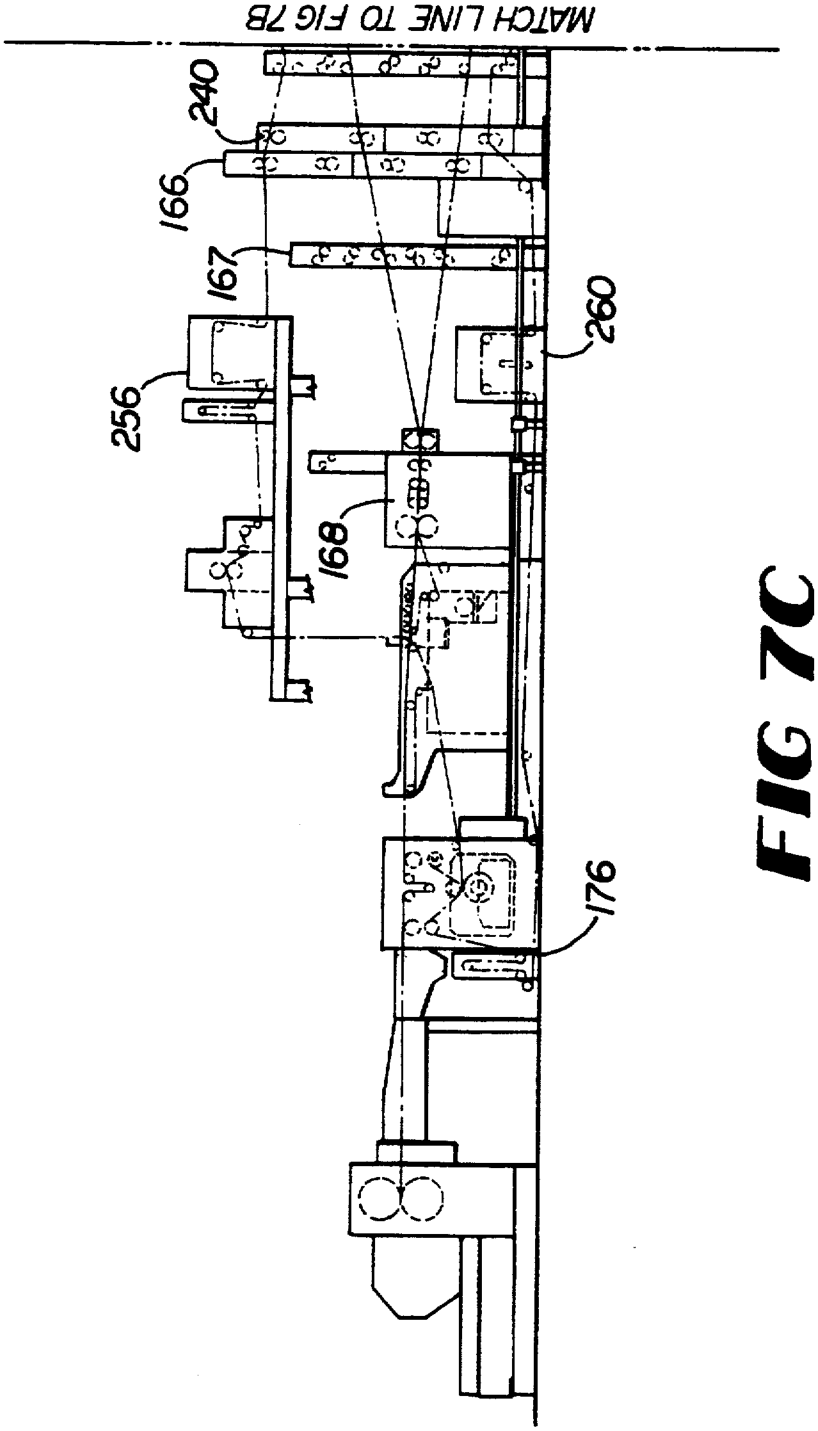

Webs $W_1$, $W_2$, and $W_3$ subsequently are routed through dryer 130 and slitters 144 designed to slit the webs into web "ribbons" $R_{1-n}$ of varying widths. For example, an $8\frac{1}{2}$" width ribbon may be created from a web containing a sequence of printed copies of a standard business letter. Slitters 144 also may be used to trim any unneeded paper from the webs and to perforate them longitudinally if desired. After completing this portion of in-line finishing (block 40), web ribbons $R_{1-n}$ may be conveyed through a multi-level angle bar 148 designed to reorient them by 90° so that the ribbons are approximately parallel to the webs travelling through printing units 88 and 100. As alluded to above, this reorientation and "horseshoe" arrangement may be used depending on the space available in the plant. Alternatively, if in-line processing is complete, ribbons $R_{1-n}$ may be conveyed to folding and sheeting equipment such as folder 112 and sheeter 116 (FIG. 7A) as appropriate.

The gathering and inserting, cutting, and delivering functions (blocks 44, 48, and 52) are performed principally by equipment shown in FIGS. 2 and 7A–C. Included in FIGS. 2 and 7A–C are a compensator stack and verification system 152, pattern gluers 160, plow towers 162, idler stands 165 and 167, variable pull roll stand 166, roll cutter 168, and gravure gluer 172 which gather and insert materials (block 44) ultimately forming, e.g., direct mailings. Rotary cutter 176 cuts the finished products (block 48) and delivers them (block 52) to their final destination on line 20. Cutter 176 may be a Western Printing Machinery Incorporated Rota-Cutter having the same circumference as printing units 88. Gluers 160 and plow towers 162 may be products of Special Products Engineering Company.

FIGS. 2–7 also include a variety of mechanisms designed to support the operations of line 20. Vertical drive 192 and gravure idler motor 196 (designed to prevent ink from drying in the gravure units when line 20 is not in operation), for example, function as part of drive line 76, which also includes a coupled cross-over drive line 204, torque follower helper motors 208, and a coupled continuation line 212. Pull roll stands 216, silicon units 220, and web guides 224 assist in negotiating webs $W_1$, $W_2$, and $W_3$ and controlling them through printing line 20, with silicon units 220 lubricating the webs as appropriate for the types of paper travelling through line 20. Web compensators 232 counteract any in-line registration inconsistencies revealed by the control equipment, while mounting slides 236 permit printers 132 to travel the width of the ribbons formed from webs $W_1$, $W_2$, and $W_3$.

B. Gathering and Inserting Equipment

Figure 8:
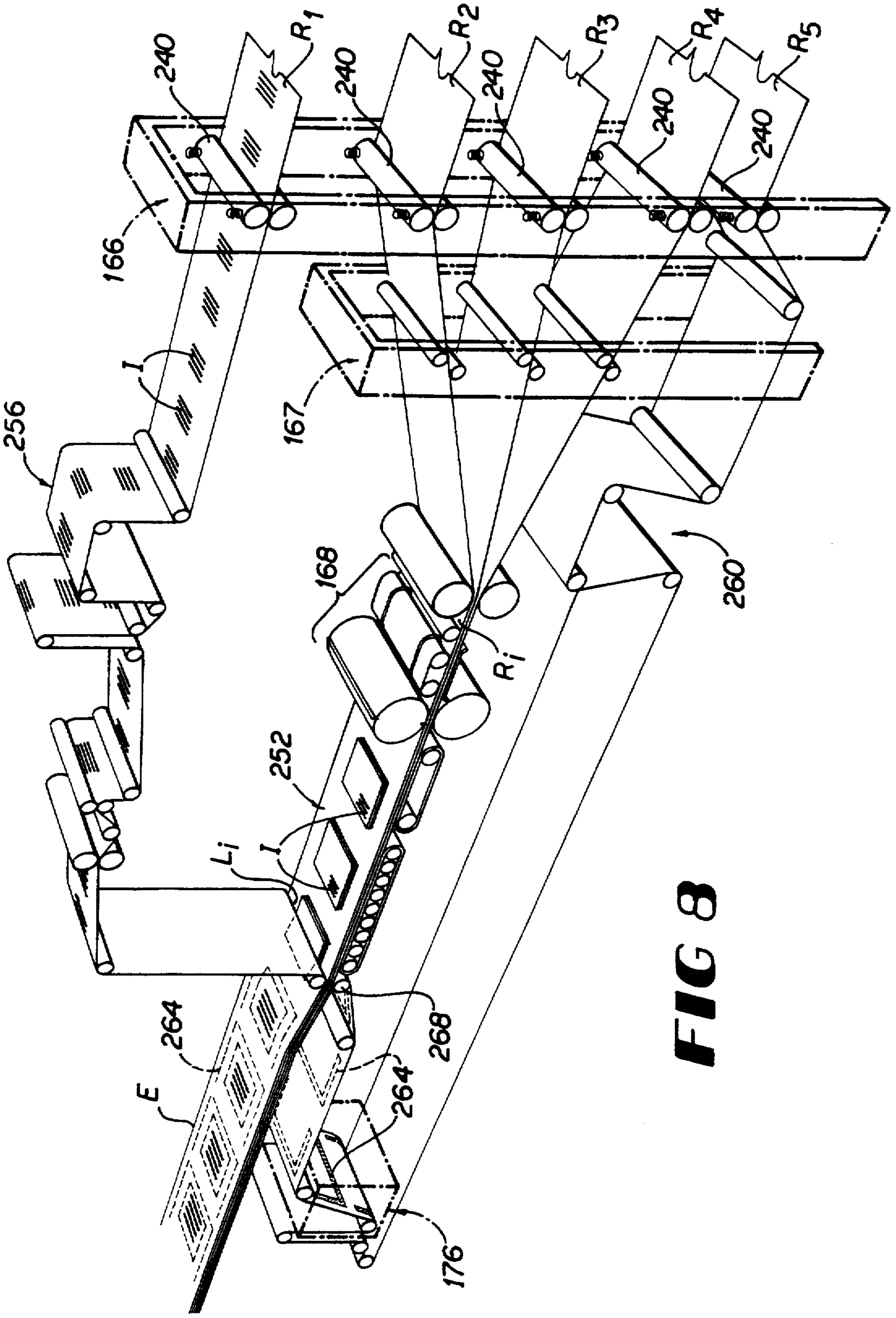
FIG. 8 is a partially schematicized perspective view of the gathering and inserting equipment of FIGS. 2 and 7.

FIG. 8 illustrates in partially schematicized form portions of the gathering and inserting equipment shown in FIGS. 2 and 7 performing the operations of block 44 of FIG. 1. Referring to FIG. 8, ribbons $R_1$, $R_2$, $R_3$, $R_4$, and $R_5$, formed from webs $W_1$, $W_2$, and $W_3$, are illustrated entering variable pull roll stand 166. In the embodiment of FIG. 8, ribbon $R_1$ ultimately will form the front portion of a series of envelopes (i.e. the portion bearing address information), ribbon $R_5$ will form the back portion of the envelope series, and ribbons $R_2$, $R_3$, and $R_4$ represent the materials to be inserted in each envelope. As those having ordinary skill in the art will recognize, virtually any number of ribbons $R_{1-n}$ may be accommodated by the equipment of the present invention as necessary for the products being created.

Variable roll stand 166 includes a pair of nip rollers 240 associated with each of the insert material ribbons $R_2$, $R_3$, and $R_4$. Each of nip roller pairs 240 includes a driven roller 244 and a follower roller 248 between which its associated insert ribbon passes. Driven rollers 244 are, however, driven independently of one another, permitting the tension on each insert ribbon $R_2$, $R_3$, and $R_4$ to be controlled separately. By independently controlling the tension on each insert ribbon $R_2$, $R_3$, and $R_4$, webs having differing coefficients of friction or different tension requirements for stability can easily be accommodated as ribbons $R_2$, $R_3$, and $R_4$ are merged through idler roll stand 167 into a single insert stream $R_i$.

Following the merging, or "gathering," of the insert ribbons, insert stream $R_i$ is directed from roll stand 167 into a cutter 168 which cuts the stream into individual sets of insert materials I of appropriate sizes. Insert sets I subsequently travel via belt conveyer 252 to a location $L_i$ for "insertion" into envelope streams formed from ribbons $R_1$ and $R_5$. Conveyer 252 is designed to operate at a speed equal to that of ribbons $R_1$ and $R_5$ but greater than that of insert sets I exiting cutter 168, so that the insert sets may be spaced appropriately when "inserted" into the envelope streams at $L_i$.

Each of ribbons $R_1$ and $R_5$ similarly travels through an associated nip roller pair 240 of variable pull roll stand 166, permitting independent tension control of each ribbon as described above. Ribbons $R_1$ and $R_5$ may then travel through speed compensators 256 and 260, respectively, as appropriate before reaching insertion location $L_i$. Additionally, ribbon $R_1$ may pass through a cutter 261 for cutting windows or other features of the envelopes and ribbon $R_5$ may pass through another compensator 262 and through gluer 172, receiving spaced, "C"-shaped applications of adhesive 264 prior to reaching location $L_i$.

At $L_i$, ribbons $R_1$ and $R_5$ and insert sets I are merged into a single envelope stream E for further processing. Ribbon $R_5$, which comprises the back portion of the envelopes ultimately formed from stream E, approaches location $L_i$ from below, while ribbon $R_1$, comprising the front portions, approaches location $L_i$ from above. As ribbons $R_1$ and $R_5$ reach location $L_i$, they are oriented so as to pass between nip rollers 268 with adhesive 264 facing a surface of ribbon $R_1$. Conveyor 252 carries insert sets I to location $L_i$ so that the insert sets pass through nip rollers 268 between ribbons $R_1$ and $R_5$. Passing through nip rollers 268 causes adhesive applications 264 to adhere portions of ribbon $R_5$ to ribbon $R_1$, effectively forming pockets capturing each insert set I within a single multi-ply envelope stream E. Stream E then travels to a gluer where adhesive is applied for the flaps of the envelopes to be created and to additional finishing equipment such as plow 270 for folding back the adhesive-laden flaps and cutter 176 for cutting the stream into individual envelopes.

C. Speed Change Mechanism

Figure 9:
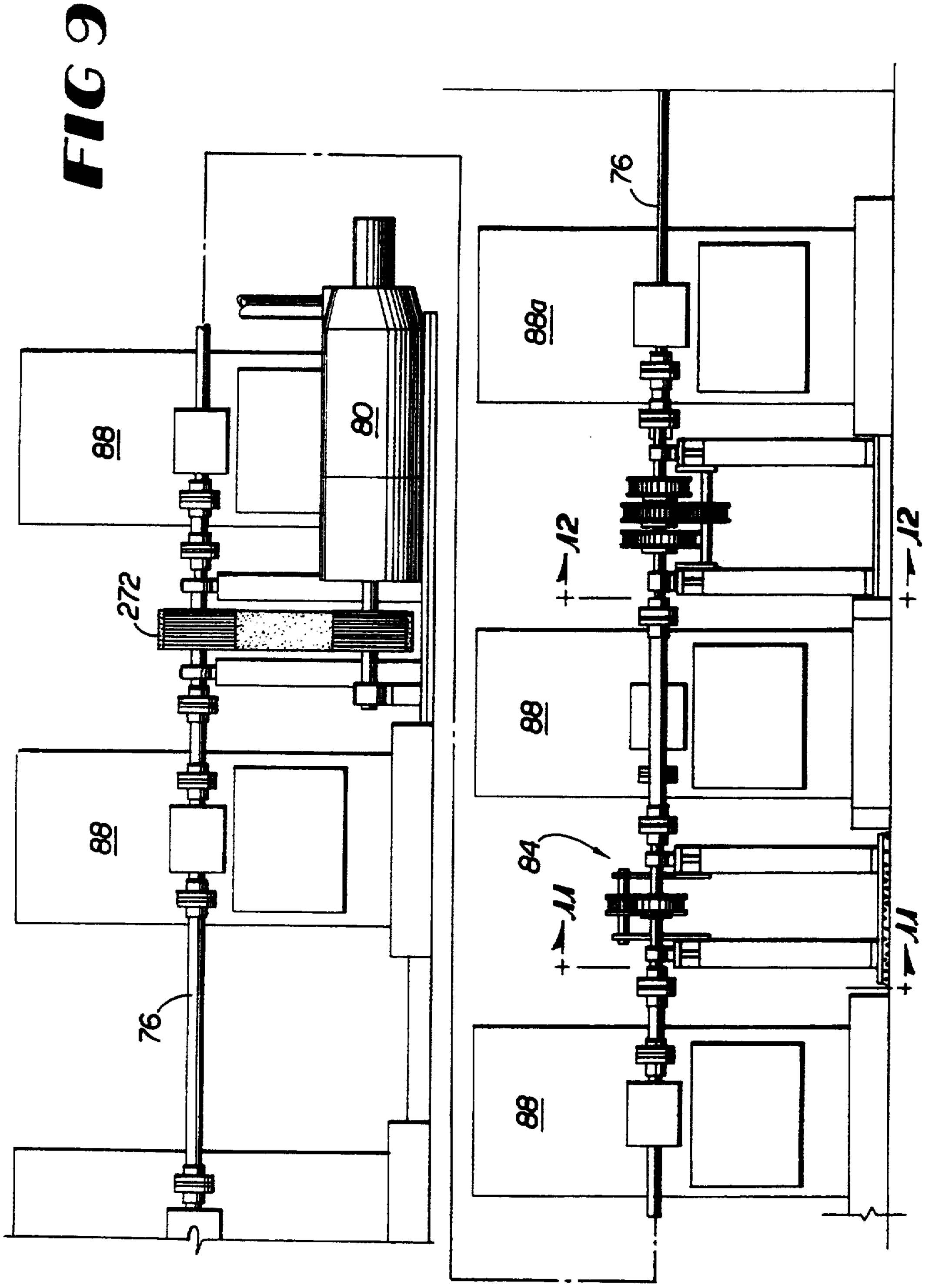
FIG. 9 is a side elevational view of the mechanism used to operate portions of the equipment of FIG. 2 at unequal speeds.
Figure 10:
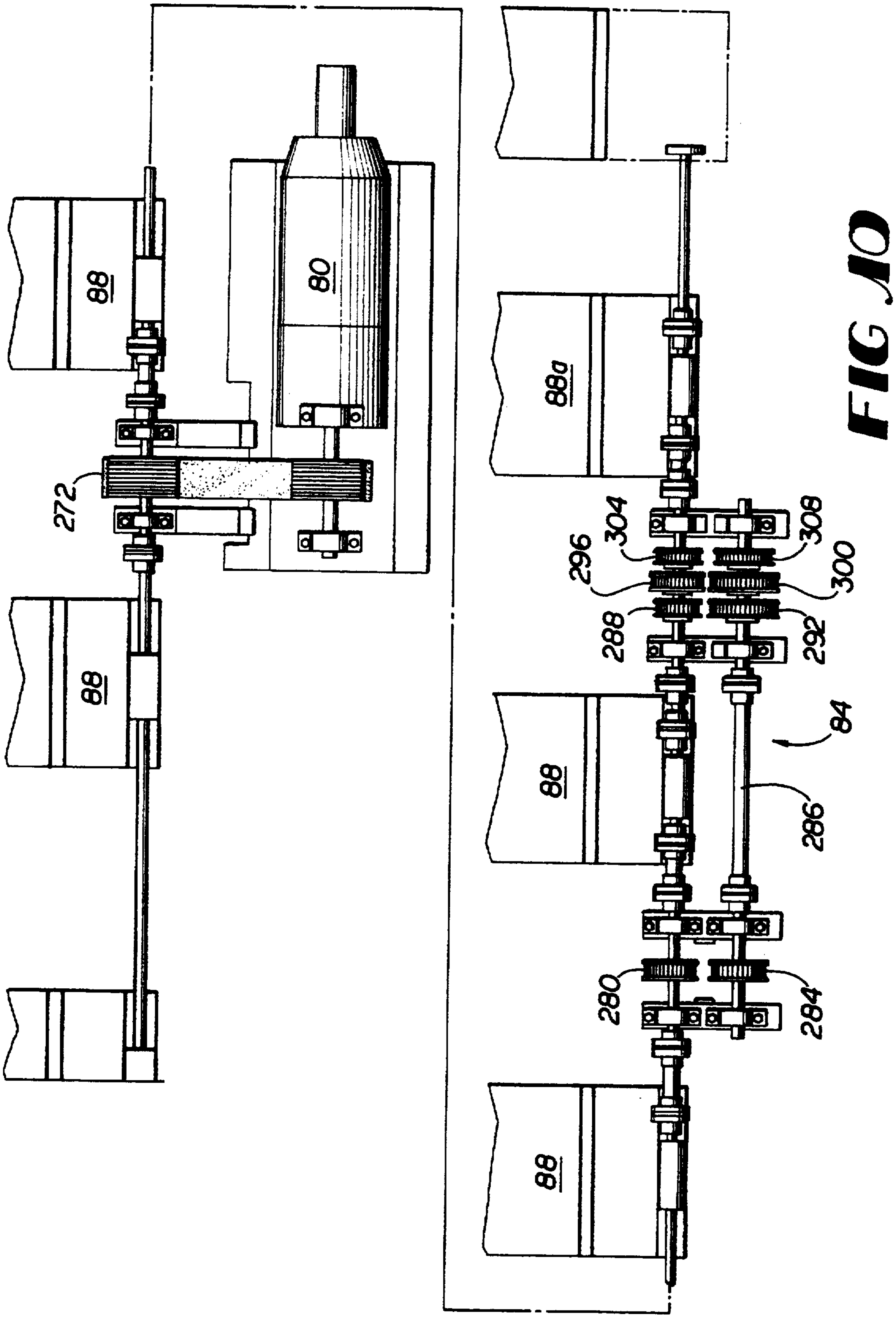
FIG. 10 is a top plan view of the mechanism of FIG. 9.
Figure 11:
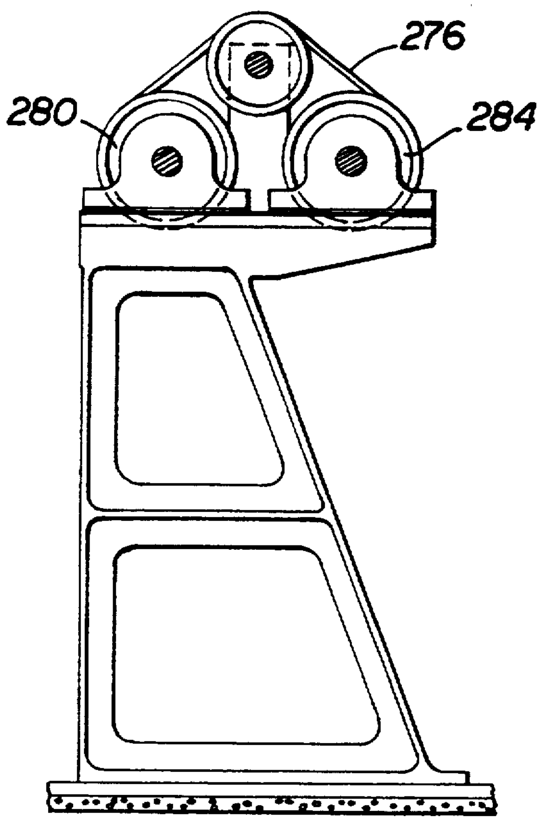
FIG. 11 is a cross-sectional view taken along lines 11—11 of FIG. 9.
Figure 12:
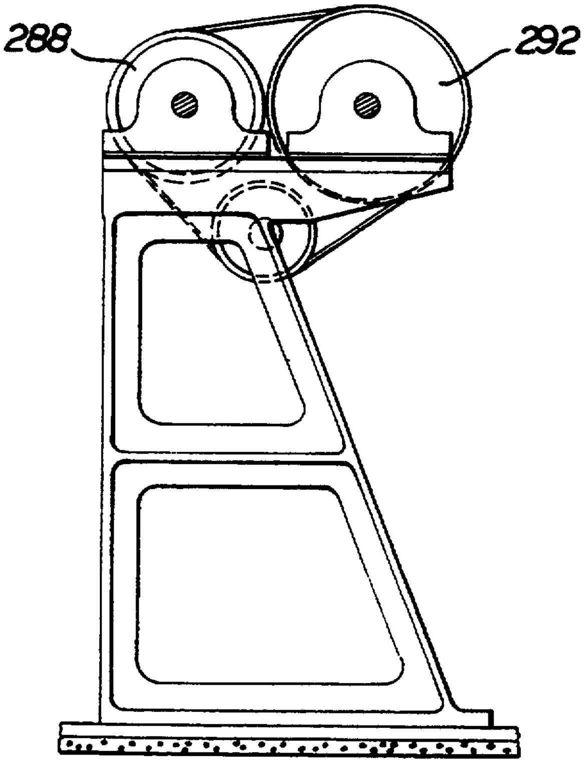
FIG. 12 is a cross-sectional view taken along lines 12—12 of FIG. 9.

FIGS. 9–12 detail the components of speed change drive mechanism 84. Drive motor 80, coupled to drive line 76 via belt 272, propels drive line 76 and the equipment directly coupled to it at a nominal speed $S_n$ while printing line 20 is in operation. Because, as discussed above, selected components of line 20 must operate at speeds other than $S_n$ when certain products are being created, drive line 76 includes speed change mechanism 84. Coupled to drive line 76 with a belt 276 surrounding equivalent-sized pulleys 280 and 284 (introducing a 1:1 speed transfer ratio from drive line 76), the shaft 286 of speed change mechanism 84 in turn may be coupled via one of a number of pulley sets to the selected components needed to operate at speeds different from $S_n$. FIGS. 9–10, for example, detail three sets of pulleys, 288 and 292, 296 and 300, and 304 and 308, each of which may be utilized to gear printer 88a to a speed other than $S_n$. As illustrated in FIGS. 9–12, pulley sets 288 and 292, 296 and 300, and 304 and 308 may be used to increase the operational speed of printer 88a to, respectively, 150%, 133%, and 125% of $S_n$. Utilizing other pulley sets of varying size ratios provides alternative speed change possibilities, while coupling speed change mechanism 84 to drive line 76 at other locations permits additional components of line 20 to be operated at speeds other than $S_n$ as well. Additionally, couplings may be included which by-pass speed change mechanism 84 and permit all components of printing line 20 coupled to drive line 76 to operate at speed $S_n$.

Using the speed change pulley sets permits selected equipment coupled to the sets, such as printer 88a, to operate at a speed different from the remainder of the press components. This speed change allows the number of printed impressions per revolution of the printing cylinder of printer 88a for one or more webs (e.g. $W_1$) to differ from the number of impressions on the other webs (e.g. $W_2$) printed concurrently on printing line 20. If each impression on web $W_1$ is, for example, larger than its corresponding impression on web $W_2$, fewer impressions per given length of web $W_1$ would be required. Absent variable control of the operating equipment as provided herein, a substantial portion of web $W_2$ would not contain printed matter, resulting in substantial unnecessary waste.

D. Verification

Verifying that the components of printing line 20 are operating in synchronization, if desired, may be accomplished in several ways. For example, one or more of ribbons $R_{1-n}$, may be marked with visible or invisible ink or otherwise coded periodically to permit inspection as required. Compensator stack and verification system 152 alternatively or additionally may include a video camera to transmit to a computer information concerning the images printed on ribbons $R_{1-n}$. The transmitted information then may be compared with parameters available from the data control systems 140 used for controlling the variable ink jet printers 132 and any required adjustments made.

The foregoing is provided for purposes of illustrating, explaining, and describing embodiments of the present invention. Modifications and adaptations to these embodiments will be apparent to those of ordinary skill in the art and may be made without departing from the scope or spirit of the invention. In particular, equipment may be added to, omitted or decoupled from, or bypassed by printing line 20 as appropriate depending on the type of product to be created. Similarly, although printing line 20 functions effectively in producing direct mail materials, other products may be created using the apparatus and techniques described herein. For example, the gathering and inserting equipment forming part of the present invention may be used to form a single, multi-layer web having other materials, whether printed or not, captured inside.

What is claimed is:

1. A method for printing on a plurality of webs, comprising the steps of:

a. printing an image on a first web using a first print cylinder supplying a first number of printed impressions per revolution;

b. printing an image on a second web using a second print cylinder supplying a second number of printed impressions per revolution;

c. fixing the printed imagines;

d. printing registrable information on the first web;

e. dividing the first web into first and second ribbons, each of which contains printed registrable information;

f. registering and maintaining the registration of the registrable information contained on the first and second ribbons;

g. coupling the first and second print cylinders to the same drive means;

h. severing a portion of the first ribbon; and i. adhering the second ribbon to the second web while inserting the severed portion of the first ribbon therebetween.

2. A method according to claim 1 further comprising the step of independently controlling the tension of the first and second ribbons and the second web.

* * * * *